US009083686B2

(12) United States Patent　　　(10) Patent No.: US 9,083,686 B2
Chatterjee　　　(45) Date of Patent: Jul. 14, 2015

(54) PROTOCOL FOR PROGRAM DURING STARTUP SEQUENCE

(75) Inventor: Manjirnath Chatterjee, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1193 days.

(21) Appl. No.: 12/478,616

(22) Filed: Jun. 4, 2009

(65) Prior Publication Data

US 2010/0121965 A1　　May 13, 2010

Related U.S. Application Data

(60) Provisional application No. 61/113,965, filed on Nov. 12, 2008.

(51) Int. Cl.
*G06F 15/16* (2006.01)
*H04L 29/06* (2006.01)
*H04L 9/32* (2006.01)

(52) U.S. Cl.
CPC .............. *H04L 63/08* (2013.01); *H04L 9/3236* (2013.01); *H04L 63/0823* (2013.01); *H04L 63/10* (2013.01); *H04L 2209/80* (2013.01)

(58) Field of Classification Search
CPC ...... H04L 63/08; H04L 63/10; H04L 63/0823
USPC ....................................................... 709/229
See application file for complete search history.

(56) References Cited

U.S. PATENT DOCUMENTS

| 5,375,226 A | 12/1994 | Sano et al. |
| 5,455,466 A | 10/1995 | Parks et al. |
| 5,596,567 A | 1/1997 | deMuro et al. |
| 5,600,225 A | 2/1997 | Goto |
| 5,666,530 A | 9/1997 | Clark et al. |
| 5,733,313 A | 3/1998 | Barreras et al. |
| 5,760,580 A | 6/1998 | Tyren |
| 5,831,348 A | 11/1998 | Nishizawa |
| 5,958,051 A | 9/1999 | Renaud et al. |

(Continued)

FOREIGN PATENT DOCUMENTS

| CN | 1592197 A | 3/2005 |
| EP | 395469 A2 | 10/1990 |

(Continued)

OTHER PUBLICATIONS

U.S. Appl. No. 11/430,786, filed May 8, 2006, Baraban et al.

(Continued)

*Primary Examiner* — Yves Dalencourt
(74) *Attorney, Agent, or Firm* — Mahamedi Paradice LLP

(57) ABSTRACT

A system and a method to determine if a client (e.g., an accessory (or peripheral)) is appropriately licensed for interoperation with a host (e.g., host computer). The client communicatively couples the host and receives a contract from the host. The client computes a checksum of the contract and compares the checksum of the contract with a previously stored version of the contract or a checksum of the contract to determine a match. If there is no match, the host communicatively decouples the client in response to the determination being a no match. If there is a match, the client transmits a contract response to the host and awaits host authorization. Once authorized the client transmits enumeration data to the host.

8 Claims, 5 Drawing Sheets

(56) References Cited

U.S. PATENT DOCUMENTS

| | | |
|---|---|---|
| 6,006,274 A | 12/1999 | Hawkins et al. |
| 6,138,245 A | 10/2000 | Son et al. |
| 6,184,651 B1 | 2/2001 | Fernandez et al. |
| 6,266,539 B1 | 7/2001 | Pardo |
| 6,330,436 B1 | 12/2001 | Zidel |
| 6,389,423 B1 | 5/2002 | Sakakura |
| 6,400,274 B1 | 6/2002 | Duan et al. |
| 6,405,049 B2 | 6/2002 | Herrod et al. |
| 6,436,299 B1 | 8/2002 | Baarman et al. |
| 6,445,936 B1 | 9/2002 | Cannon et al. |
| 6,501,364 B1 | 12/2002 | Hui et al. |
| 6,510,424 B1 | 1/2003 | Ford et al. |
| 6,532,152 B1 | 3/2003 | White et al. |
| 6,673,250 B2 | 1/2004 | Kuennen et al. |
| 6,731,071 B2 | 5/2004 | Baarman |
| 6,795,110 B1 | 9/2004 | Kossin |
| 6,803,744 B1 | 10/2004 | Sabo |
| 6,806,649 B2 | 10/2004 | Mollema et al. |
| 6,810,405 B1 | 10/2004 | LaRue et al. |
| 6,812,645 B2 | 11/2004 | Baarman |
| 6,825,620 B2 | 11/2004 | Kuennen et al. |
| 6,831,417 B2 | 12/2004 | Baarman |
| 6,888,438 B2 | 5/2005 | Hui et al. |
| 6,917,163 B2 | 7/2005 | Baarman |
| 6,975,198 B2 | 12/2005 | Baarman et al. |
| 6,986,051 B2 | 1/2006 | Le Pennec et al. |
| 7,065,658 B1 | 6/2006 | Baraban et al. |
| 7,116,200 B2 | 10/2006 | Baarman et al. |
| 7,118,240 B2 | 10/2006 | Baarman et al. |
| 7,126,450 B2 | 10/2006 | Baarman et al. |
| 7,132,918 B2 | 11/2006 | Baarman et al. |
| 7,149,473 B1 | 12/2006 | Lindlar et al. |
| 7,164,255 B2 | 1/2007 | Hui |
| 7,248,017 B2 | 7/2007 | Cheng et al. |
| 7,262,700 B2 | 8/2007 | Hsu |
| 7,271,569 B2 | 9/2007 | Oglesbee |
| 7,286,880 B2 | 10/2007 | Olson et al. |
| 7,323,964 B1 | 1/2008 | Shyu et al. |
| 7,331,793 B2 | 2/2008 | Hernandez et al. |
| 7,375,492 B2 | 5/2008 | Calhoon et al. |
| 7,382,636 B2 | 6/2008 | Baarman et al. |
| 7,385,357 B2 | 6/2008 | Kuennen et al. |
| 7,392,059 B2 | 6/2008 | White et al. |
| 7,414,380 B2 | 8/2008 | Tang et al. |
| 7,446,672 B2 | 11/2008 | Johnson et al. |
| 7,454,170 B2 | 11/2008 | Goossens et al. |
| 7,462,951 B1 | 12/2008 | Baarman |
| 7,471,986 B2 | 12/2008 | Hatlestad |
| 7,495,414 B2 | 2/2009 | Hui |
| 7,521,890 B2 | 4/2009 | Lee et al. |
| 7,576,514 B2 | 8/2009 | Hui |
| 7,743,151 B2 | 6/2010 | Vallapureddy et al. |
| 2002/0084698 A1 | 7/2002 | Kelly et al. |
| 2002/0103008 A1 | 8/2002 | Rahn et al. |
| 2003/0214255 A1 | 11/2003 | Baarman et al. |
| 2003/0233455 A1 * | 12/2003 | Leber et al. ............ 709/226 |
| 2004/0088012 A1 | 5/2004 | Kroll et al. |
| 2004/0130915 A1 | 7/2004 | Baarman |
| 2004/0130916 A1 | 7/2004 | Baarman |
| 2004/0150934 A1 | 8/2004 | Baarman |
| 2004/0222751 A1 | 11/2004 | Mollema et al. |
| 2004/0232845 A1 | 11/2004 | Baarman et al. |
| 2004/0259499 A1 | 12/2004 | Oba et al. |
| 2004/0266362 A1 | 12/2004 | Watkins et al. |
| 2005/0007067 A1 | 1/2005 | Baarman et al. |
| 2005/0093475 A1 | 5/2005 | Kuennen et al. |
| 2005/0116650 A1 | 6/2005 | Baarman |
| 2005/0122058 A1 | 6/2005 | Baarman et al. |
| 2005/0122059 A1 | 6/2005 | Baarman et al. |
| 2005/0127849 A1 | 6/2005 | Baarman et al. |
| 2005/0127850 A1 | 6/2005 | Baarman et al. |
| 2006/0041420 A1 | 2/2006 | Martin et al. |
| 2006/0061958 A1 | 3/2006 | Solomon et al. |
| 2006/0123055 A1 | 6/2006 | Atkinson et al. |
| 2006/0132045 A1 | 6/2006 | Baarman |
| 2006/0187049 A1 | 8/2006 | Moser et al. |
| 2007/0035917 A1 | 2/2007 | Hotelling et al. |
| 2007/0064406 A1 | 3/2007 | Beart |
| 2007/0120752 A1 | 5/2007 | Takasu |
| 2007/0182367 A1 | 8/2007 | Partovi |
| 2007/0188284 A1 | 8/2007 | Dobbs |
| 2007/0246546 A1 | 10/2007 | Yoshida |
| 2007/0290654 A1 | 12/2007 | Govari et al. |
| 2008/0133918 A1 | 6/2008 | You et al. |
| 2008/0196086 A1 * | 8/2008 | Shintani et al. .............. 726/4 |
| 2008/0231537 A1 | 9/2008 | Rofougaran et al. |
| 2008/0278894 A1 | 11/2008 | Chen et al. |
| 2009/0001932 A1 | 1/2009 | Kamijo et al. |
| 2009/0001941 A1 | 1/2009 | Hsu et al. |
| 2009/0008148 A1 | 1/2009 | Mashino |
| 2009/0069869 A1 | 3/2009 | Stouffer et al. |
| 2009/0088077 A1 | 4/2009 | Brown et al. |
| 2009/0106567 A1 | 4/2009 | Baarman |
| 2009/0170433 A1 | 7/2009 | Rhodes et al. |
| 2009/0212637 A1 | 8/2009 | Baarman et al. |
| 2009/0212737 A1 | 8/2009 | Johnson et al. |
| 2010/0007449 A1 | 1/2010 | Tait et al. |
| 2010/0021176 A1 | 1/2010 | Holcombe et al. |
| 2010/0045269 A1 | 2/2010 | LaFranchise et al. |
| 2010/0070219 A1 | 3/2010 | Azancot et al. |
| 2010/0076524 A1 | 3/2010 | Forsberg et al. |
| 2010/0081377 A1 | 4/2010 | Corbridge et al. |
| 2010/0081473 A1 | 4/2010 | Chatterjee et al. |
| 2010/0081483 A1 | 4/2010 | Chatterjee et al. |
| 2010/0083012 A1 | 4/2010 | Corbridge et al. |
| 2010/0131691 A1 | 5/2010 | Chatterjee et al. |
| 2010/0146308 A1 | 6/2010 | Gioscia et al. |
| 2010/0156193 A1 | 6/2010 | Rhodes et al. |
| 2010/0172090 A1 | 7/2010 | Chatterjee |
| 2010/0177476 A1 | 7/2010 | Hotelling et al. |
| 2010/0194336 A1 | 8/2010 | Azancot et al. |

FOREIGN PATENT DOCUMENTS

| | | |
|---|---|---|
| FR | 2601161 A1 | 1/1988 |
| GB | 2389720 B | 9/2005 |
| GB | 2399466 B | 11/2005 |
| GB | 2389767 B | 4/2006 |
| JP | 09-259241 A | 10/1997 |
| JP | 11-354348 A | 12/1999 |
| JP | 3161388 B2 | 2/2001 |
| KR | 10-0836634 B1 | 6/2008 |
| WO | WO 95/03686 A1 | 2/1995 |
| WO | WO 2004/098079 A1 | 11/2004 |
| WO | WO 2005/024865 A2 | 3/2005 |
| WO | WO 2007/034421 A2 | 3/2007 |
| WO | WO 2008/033670 A2 | 3/2008 |
| WO | WO 2008/044875 A1 | 4/2008 |
| WO | WO 2008/133806 A1 | 11/2008 |
| WO | WO 2009/057771 A1 | 5/2009 |
| WO | WO 2010/005324 A1 | 1/2010 |
| WO | WO 2010/062198 A1 | 6/2010 |
| WO | WO 2010/068062 A2 | 6/2010 |
| WO | WO 2010/068062 A3 | 7/2010 |
| WO | WO 2010/091269 A1 | 8/2010 |

OTHER PUBLICATIONS

U.S. Appl. No. 12/628,401, filed Dec. 1, 2009, Chatterjee.
U.S. Appl. No. 12/840,241, filed Jul. 20, 2010, Chatterjee.
U.S. Appl. No. 12/841,001, filed Jul. 21, 2010, Chatterjee.
U.S. Appl. No. 29/323,688, filed Aug. 28, 2008, Matsuoka.
Final Office Action mailed Jan. 8, 2009 in U.S. Appl. No. 11/430,786.
Final Office Action mailed Oct. 25, 2004 in U.S. Appl. No. 09/861,658 10 pgs.
Final Office Action mailed Jul. 9, 2007 in U.S. Appl. No. 11/430,786.
Final Office Action mailed Jul. 19, 2010 in U.S. Appl. No. 11/430,786.
Final Office Action mailed Dec. 30, 2009 in U.S. Appl. No. 11/430,786.
Hui et al., "A New Generation of Universal Contactless Battery Charging Platform for Portable Consumer Electronic Equipment," IEEE Trans Power Electronics, 20(3):620-627 (2005).

(56) References Cited

OTHER PUBLICATIONS

International Search Report and Written Opinion dated Jul. 21, 2010 in International Application No. PCT/US2009/068328.
International Search Report and Written Opinion dated Jul. 28, 2010 in International Application No. PCT/US2009/068332.
International Search Report and Written Opinion dated Aug. 20, 2010 in International Application No. PCT/US2009/069847.
International Search Report and Writen Opinion dated Aug. 31, 2010 in International Application No. PCT/US2010/020054.
International Search Report and Written Opinion dated Apr. 20, 2010 in International Application No. PCT/US2009/055928.
Kean, Steven, "Powermat Portable Wireless Charging Mat", pp. 1-12 dwnloaded from http://www.bigbruin.com/content/powermat_1 on Sep. 29, 2010.
Liang et al., "An implantable bi-directional wireless transmission system for transcutaneous biological signal recording," Physiol. Meas. 26:83-97 (2005).
Mel, B. W. et al., "Tablet: Personal Computer in the Year 2000", Communications of the Association for Computing machinery, New Your, NY vol. 31, No. 6, Jun. 1, 1988, 639-646 XP000047633ISSN: 0001-0782.
Non-Final Office Action mailed Mar. 24, 2010 in U.S. Appl. No. 11/430,786.
Non-Final Office Action mailed Jul. 25, 2008 in U.S. Appl. No. 11/430,786.
Non-Final Office Action mailed Sep. 30, 2010 in U.S. Appl. No. 11/430,786 7 pgs.
Non-Final Office Action mailed Jan. 25, 2008 in U.S. Appl. No. 11/430,786.
Non-Final Office Action mailed Oct. 5, 2006 in U.S. Appl. No. 11/430,786.
Non-Final Office Action mailed Apr. 22, 2004 in U.S. Appl. No. 09/861,658 7 pgs.
Non-Final Office Action mailed Apr. 7, 2005 in U.S. Appl. No. 09/861,658 11 pgs.
Non-Final Office Action mailed Jun. 11, 2009 in U.S. Appl. No. 11/430,786.
Notice of Allowance mailed Jan. 9, 2006 in U.S. Appl. No. 09/861,658 12 pgs.
Opticon Users manual DWT 7133, Nov. 2000.
International Search Report and Writen Opinion dated Feb. 23, 2011 in International Application No. PCT/US2010/042779.
U.S. Appl. No. 12/916,388, filed Oct. 29, 2010, Chatterjee et al.
U.S. Appl. No. 12/975,335, filed Dec. 21, 2010, Oh et al.
U.S. Appl. No. 12/987,940, filed Jan. 10, 2011, Chatterjee et al.

* cited by examiner

PROTOCOL FOR PROGRAM DURING STARTUP SEQUENCE

CROSS REFERENCES

This application claims a benefit of U.S. Patent Application Ser. No. 61/113,965, filed Nov. 12, 2008 and Titled "Protocol for Program During Start Up Sequence", the contents of which are herein incorporated by reference.

BACKGROUND

1. Field of Art

The disclosure generally relates to the field of user interactions with software agreements presented in electronic mediums.

2. Description of the Related Art

Generally, a primary (or main) device, for example, the mobile computing device 110, may seek to authorize a peripheral that seems to connect with it. Conventionally, this may include a hard code that is integrated with the accessory and transmitted to the device when the two are coupled together. However, such code can reverse engineered (e.g., hacked or broken) to identify them and transmit to others. This causes a breach in security of the ecosystem as the reverse engineered code may be inserted into unauthorized accessories unbeknownst to the primary device.

Computing devices, such as personal computers, are equipped with standards based protocols such as Universal Serial Bus (USB), IEEE 1394, or Bluetooth that interface with computing devices that are configured to couple with peripheral devices using one of these protocols. When a peripheral device connects to a USB or IEEE 1394 port, an enumerating protocol provides information to the computing device that identifies itself to the computing device and identifies what the peripheral device does. However, there is no mechanism by which to ensure that the peripheral device manufacturer contractually complies with the hardware specifications for the connection with the computing device.

The lack of mechanisms to enforce contractual compliance of the peripheral device with the computing device may be unwelcome and potentially damaging to the computing device. One approach to addressing this problem is to have the computing device operating system intercept data transmission attempts from the peripheral device and give a user an option to accept or not accept the data. However, this approach is cumbersome and imposes a burden on the user. Moreover, this approach is prone to human error so that data that should be allowed may not be allowed and data that should not be allowed may be allowed. Another approach to this problem requires specialized hardware interfaces that must be designed and integrated into the hardware, which is expensive due to hardware design customization.

There is lacking, inter alia, a system and a method to identify and track contractual compliance for coupling of one device or service to a second device or service and to ensure that the attaching device is compliant with the contractual terms.

BRIEF DESCRIPTION OF DRAWINGS

The disclosed embodiments have other advantages and features which will be more readily apparent from the detailed description, the appended claims, and the accompanying drawings, in which:

DETAILED DESCRIPTION

Figure 1A:
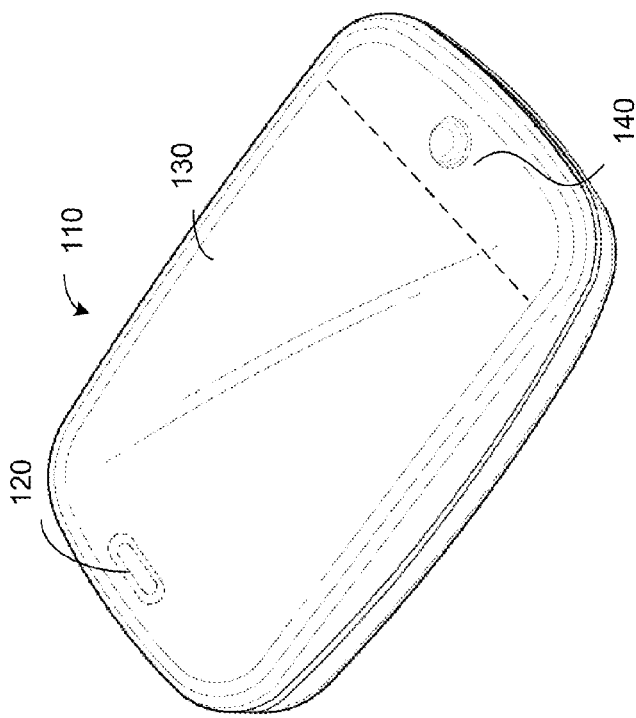
FIGS. 1a and 1b illustrate one embodiment of a mobile computing device.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles described herein.

General Overview

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

One embodiment of a disclosed system (and method) includes a system (and method) that is configured to authorize and track coupling between a first device and a second device. The configuration is through enumeration of a contract acknowledgement that is sent as the byte sequence sent form the first device to the second device and waking up the second device. In one example embodiment the first device is a host device and the second device is an accessory (or peripheral) device. The accessory may be a physical device, for example, an inductive charging station, a print device, a scan device, or a headset device. The accessory may also be a logical device, for example, a virtual disk or a software service. In addition, it is noted that a contract comprises a message (one or more data packets) corresponding to a binding agreement between two or more parties as to obligations that each party is required to adhere to as determined by the binding agreement. The contract in this context may be a legal agreement text (or an "agreement") (LAT). Responsive to the LAT may be a corresponding message (one or more data packets) that may correspond to an acknowledgment (ACK). This message (e.g., the ACK) may comprise legal response text (or a "response") (LRT). The LAT and/or LRT may form the binding agreement itself between the parties. However, it is noted that the LAT and/or LRT may reference a separate binding agreement that.

Referring back to the example embodiment, the host stores the contract (Legal Agreement Text or LAT) and the accessory (or peripheral) device stores the response acknowledgement (Legal Response Text or LRT). The LAT can be a fixed byte sequence, for example a "Haiku poem", or more formally, a license agreement. The contract acknowledgement agreement may be a LAT that confirms that the accessory device manufacturer has contractually agreed to an appropriate licensing agreement with a manufacturer of the host device.

In response, to the coupling of the devices the host device in this example transfers the LAT to the accessory device. The accessory device, upon receiving the LAT examines it to determine if the received LAT is in fact the LAT that the accessory maker has agreed to during formal company-to-company negotiations. If the LAT is the agreed to contract then the accessory responds to the LAT from the host with a legal response text (LRT). The host, upon receiving the LRT examines this as the valid acceptable response LRT. If the host accepts the received text as valid LRT then the further enumeration (such as compatibility and capabilities) can begin such as in standard protocols like V.90, USB, FIREWIRE or the like, as further disclosed herein. This exchange of contracts insures that the accessory maker (not the end user) will be required to agree to the host manufacturer's licensing terms. However in order to protect both the host manufacturer and the accessory maker each device (host, accessory) is allowed to check that the transmitted LAT/LRT in fact matches what was agreed too. An accessory maker which illegally transmits a valid LRT can be subject to breach of contract as they would be claiming compliance with a legal agreement for which they had not negotiated and/or been contractually bound with the manufacturer.

Example Mobile Computing Device

Figure 1B:
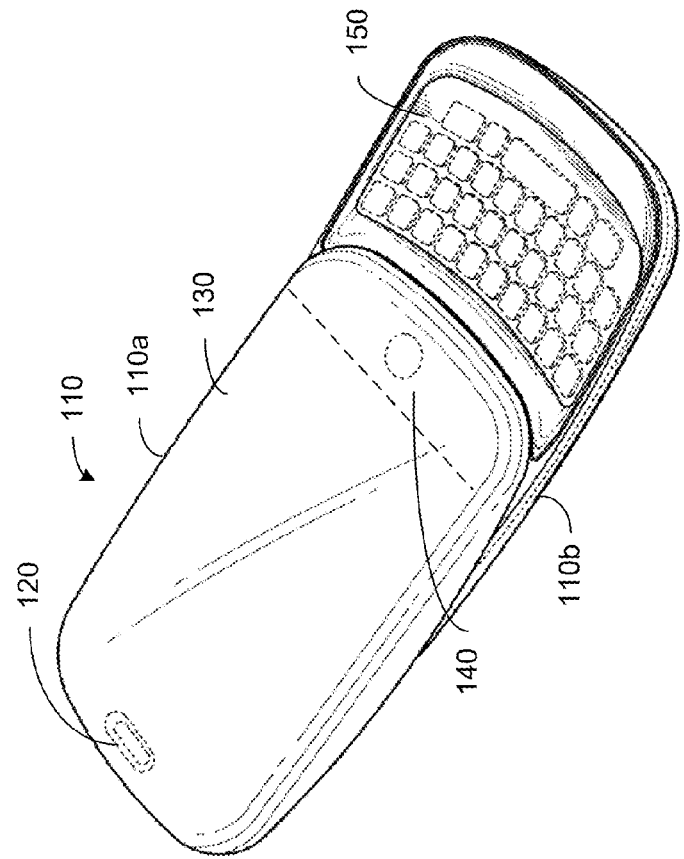

In one example embodiment, the configuration as disclosed may be configured for use between a mobile computing device, that may be host device, and an accessory device. FIGS. 1a and 1b illustrate one embodiment of a mobile computing device 110. FIG. 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, smartphone, netbook, or laptop computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other computing devices, e.g., desktop computers, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a solid-state based gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
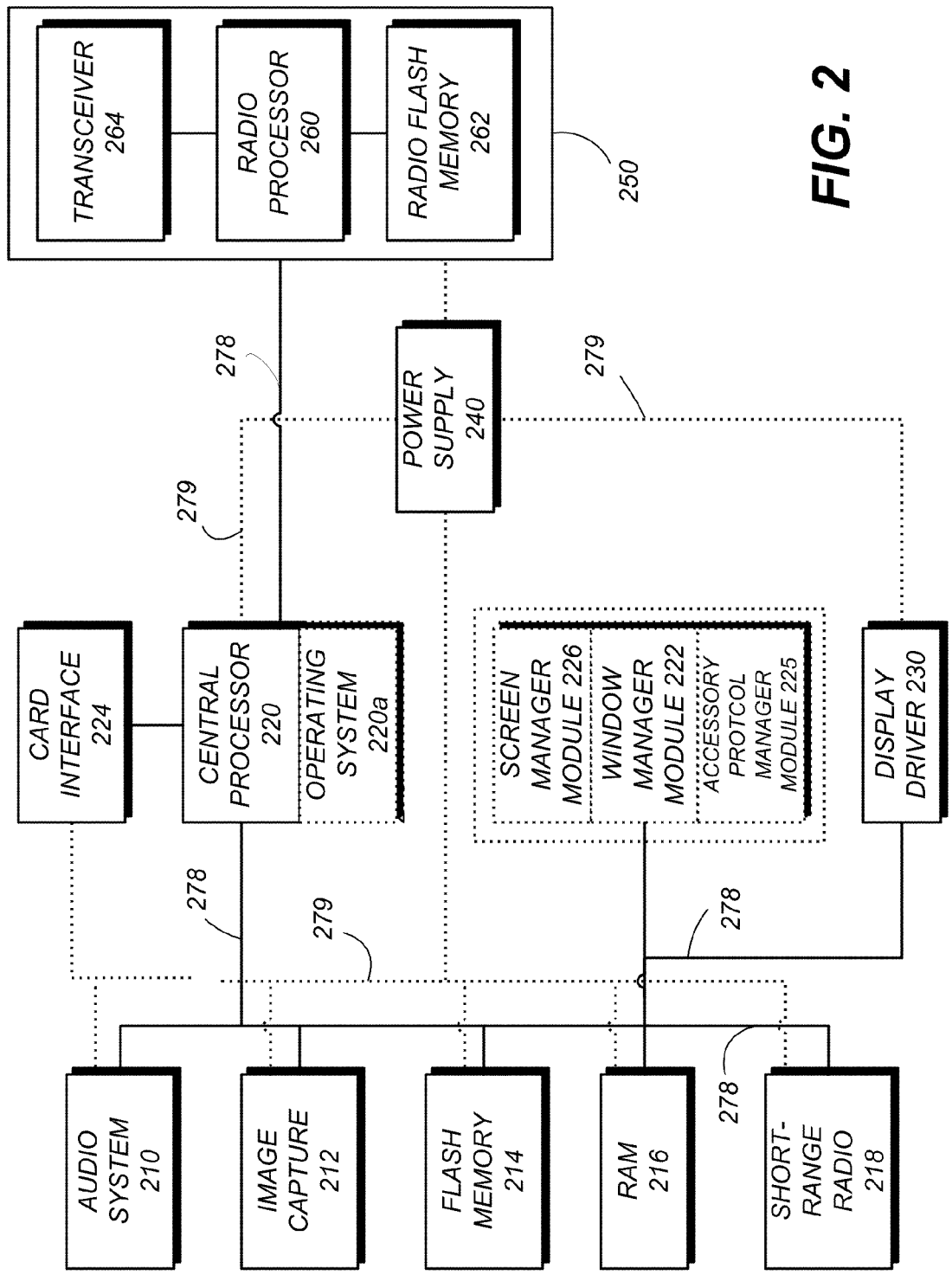
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIGS. 1a and 1b. The mobile computing device 110 includes a central processor 220, a power supply 240, and a radio subsystem 250. The central processor 220 is configured for operation with a computer operating system. The operating system is an interface between hardware and an application, with which a user typically interfaces. The operating system is responsible for the management and coordination of activities and the sharing of resources of the mobile computing device 110. The operating system provides a host environment for applications that are run on the mobile computing device 110. As a host, one of the purposes of an operating system is to handle the details of the operation of the mobile computing device 110.

The central processor 220 communicates with an audio system 210, an image capture subsystem (e.g., camera, video or scanner) 212, flash memory 214, RAM memory 216, and a short range radio module 218 (e.g., Bluetooth, Wireless Fidelity (WiFi) component (e.g., IEEE 802.11)). The central processor communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor communicates with applications executing within the mobile computing device 110 through the operating system 220a. In addition, intermediary components, for example, a window manager module 222 and a screen manager module 226, provide additional communication channels between the central processor 220 and operating system 220 and system components, for example, the display driver 230.

In one embodiment, the window manager module 222 comprises a software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises a software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

An accessory protocol manager module 225 comprises software that is, for example, integrated with the operating system or configured to be an application operational with the operating system. In some embodiments it may comprise firmware, for example, stored in the flash memory 214. The accessory protocol manager 225 is configured to store the instructions and data corresponding to the processes disclosed herein, for example, with respect to FIGS. 3 and 4. For example, the accessory protocol manager includes the logic for computing and storing checksums within the device 110 as further described herein.

In one embodiment, central processor 220 executes logic (e.g., by way of programming, code, or instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or ongoing call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile, High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using a serial line 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

Start Up Sequence for Software Program at Launch (Execution)

Figure 3:
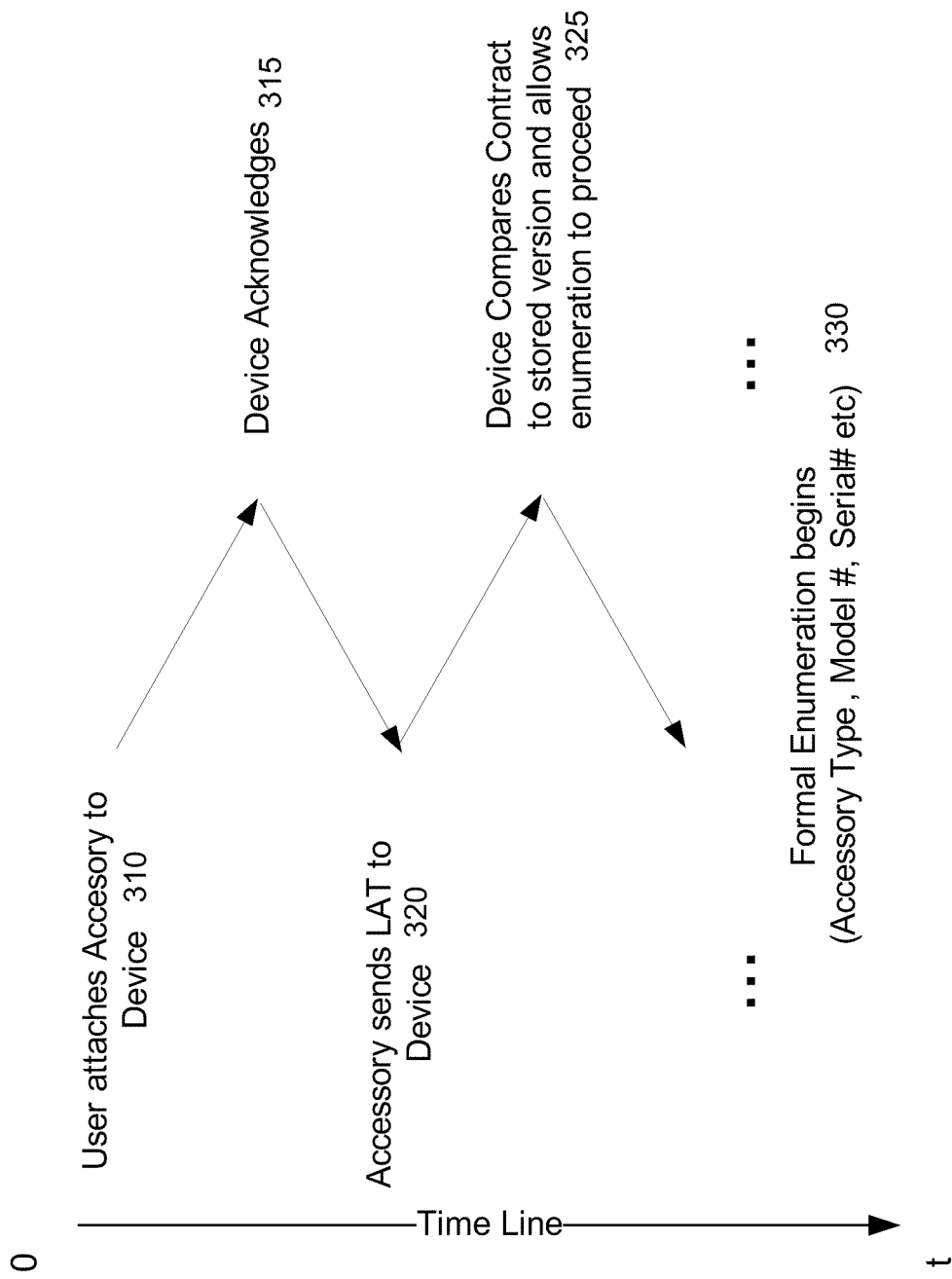
FIG. 3 illustrates one embodiment of a startup (or initialization) sequence for a software program using a pre-defined structured contract.

To ensure authorized communication between a first device and a second device an ecosystem is created to ensure authorized coupling and subsequent enumeration and communication. In an example embodiment the first device is an accessory (or peripheral) and the second device is a host computing device, e.g., the mobile computing device 110. Turning first to FIG. 3, it illustrates one embodiment of a startup (or initialization) sequence for a software program using a pre-defined structured contract. In this example, a user attaches an accessory to the mobile computing device 110. However, prior to this process occurring, the accessory and the mobile computing device 110 are configured to exchange messages (here, corresponding to the contract) to confirm that the accessory is contractually confirmed for operation with the mobile computing device. In this context, in one example embodiment the accessory is configured in this example embodiment to initiate the confirmation process. In addition, the accessory protocol manager 225 in the mobile computing device is configured to include instructions that correspond to initiating the contact verification process prior in response to the initiated confirmation process and prior to enumeration of the accessory.

The contract used for this process comprises a legal agreement text (LAT). The contact is structured to correspond with a legal response text (LRT), each of which is further described herein. In addition, in one example embodiment the LAT may be "a HAIKU" statement, i.e., a short form or limited character length contract that may reference and/or be associated with a longer contract agreed to between the accessory manufacturer and the mobile computing device 110 manufacturer.

In this example a developer of an accessory is provided, for example, from a manufacturer (or producer) of the mobile computing device 110, a contract having terms and conditions the accessory manufacturer is required to adhere to in order to communicatively couple with the mobile computing device 110. One term of the contract includes incorporation of particular contract term (or terms) that is to be exchanged between the accessory and mobile computing device 110. For ease of discussion, this term (or terms) will be referenced as a LAT is stored in a storage device of the mobile computing device 110 (e.g., flash memory 214 and/or RAM 216). A checksum of the LAT may be stored the accessory. An appropriate response to the LAT is the LRT and is stored within the accessory, e.g., a memory, a disk, or register. A checksum of the LRT may be stored in the flash memory 214 of the mobile computing device 214.

Further, in this example the contract described is an example start-up interrogation string used to control licensing in an accessory that communicatively couples with the mobile computing device 110. The communication coupling may be a wired connection, such as USB, Palm Enhanced USB, I2C, SPI, serial port, parallel port or the like or it may be a wireless connection such as UWB, Wibree, Bluetooth, Zigbee, WiFi or the like.

In addition, it is noted that for this example, a developer of an accessory may be a hardware developer. However, the developers may also be a software or services (e.g., web services) developer. Moreover, the developer is considered from the perspective of driving the technological design and may work with another entity under obligation to them to produce the product or service for market, e.g., HTC (product manufacturing) or TSMC (semiconductor foundry)).

As for example configurations in which an accessory would need to have a contractual agreement prior to utilizing an aspect of the mobile computing device 110, one example may be an agreement to use the device 110 bus/connection, e.g., the card interface 224 described with FIG. 2. Such configuration would be independent of any user interaction relative to permissions necessary for the accessory to access the bus/connection. As described below and with FIG. 4, this prior agreement includes appropriate coding that the accessory manufacturer stores within the accessory itself.

Continuing with the example in FIG. 3, a timing diagram illustrates at a first time, T=0, that an accessory is attached 310 (i.e., communicatively coupled) with a mobile computing device 110. In response, the mobile computing device 110 acknowledges 315 the coupled accessory and sends a contract, e.g., a LAT, to the accessory. The accessory "reads" the LAT and computes a checksum of the LAT to determine if it corresponds to an expected LAT. If so, the accessory prepares a response. The response may be referred to as a "signing statement" (or contract statement) and corresponds to "read" and "acceptance" of contract terms corresponding to and/or associated with the LAT (and the corresponding and/or associated obligations). The response prepared (i.e., the signing or contract statement) is the LRT. The LRT is transmitted to the mobile computing device 110.

The accessory protocol manager 225 of the mobile computing device 110 compares the received LRT to a version, which is an expected response, that is stored by in the storage, e.g., the flash memory 214. The version stored in the flash memory 214 and checked may be a checksum of the LRT. If there is a match, enumeration 330 is permitted to proceed. An example of a formal enumeration 330 by the mobile computing device 110 includes confirmation of accessory type, model number, serial number, etc. Once enumeration completes subsequent communications between the mobile computing device 110 and the accessory can continue.

In another embodiment, the device 110 is configured to communicate with the accessory similar to what was noted above, but this time also sends a hash at the end of the sent contract, e.g., the LAT. The accessory receives the LAT and computes a checksum of the LAT. However, the hash means that the accessory dynamically computes the checksum. This means that the accessory proves that it really received the contract in addition to statically stored bytes. The accessory returns the signing statement, i.e., the LRT, back to the mobile computing device 110, signifying acceptance of the terms of the LAT by the accessory. The accessory protocol manager 225 of the mobile computing device 110 compares the received LRT to a version (or checksum version) that is an expected response stored in, for example, the flash memory 214. If there is a match, enumeration 330 is permitted to proceed.

Figure 4:
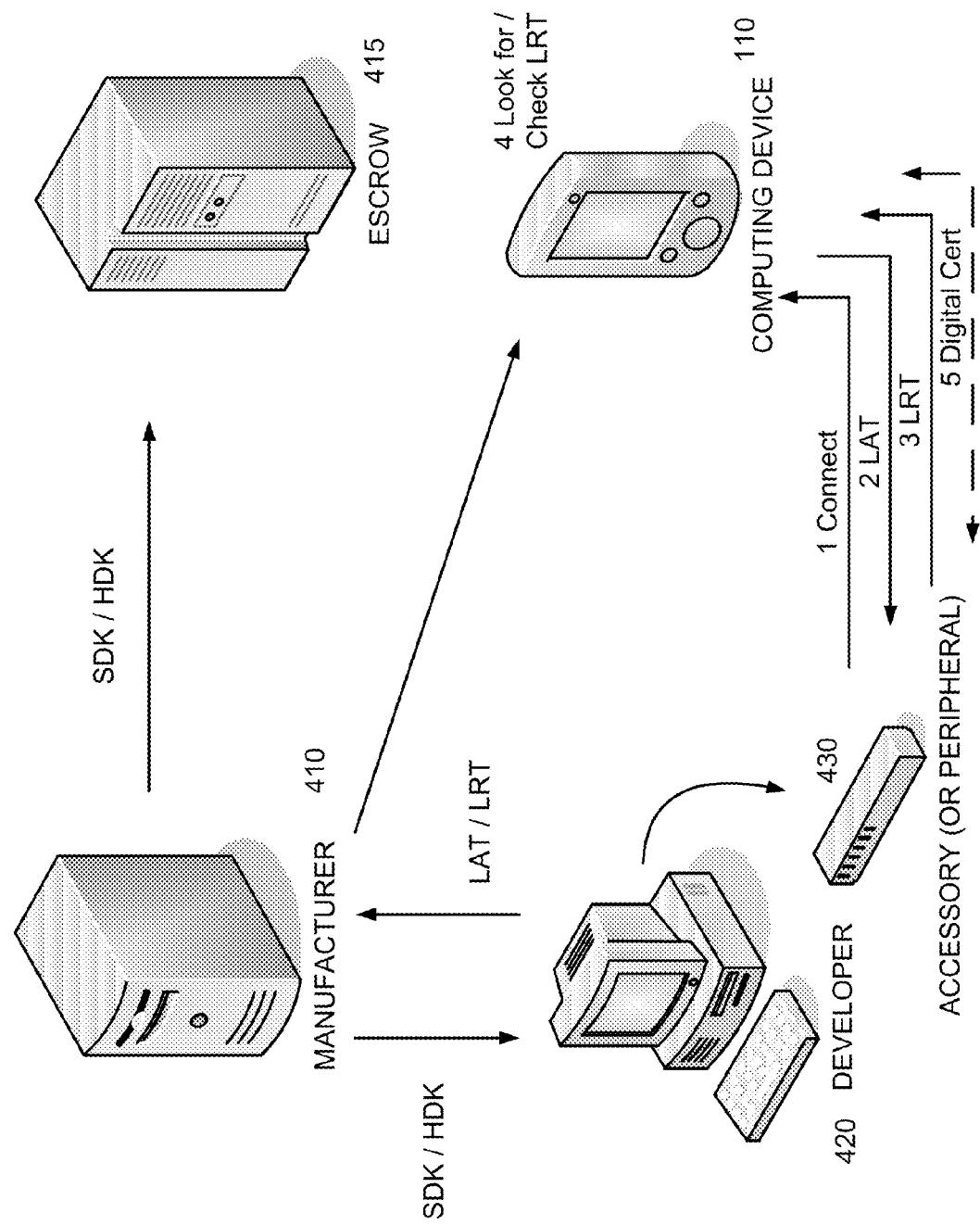
FIG. 4 illustrates one embodiment of a startup sequence for a software program launched (or executed) within a computing device, e.g., mobile computing device.

FIG. 4 illustrates one embodiment of a startup sequence for a software program launched (or executed) within a host computing device. This figure will be described in the context of an example. In this example, the computing device is the mobile computing device 110. Within FIG. 4 there is illustrated a manufacturer (or manufacturing entity) 410, an escrow (or escrow entity) 415, a developer (or developer or development entity) 420, an accessory (or peripheral 430), and a computing device, which in this example, is mobile computing device 110.

In the context of this example, the manufacturer 410 is a technology owner and an entity that manufacturers (directly) or authorizes manufacture (indirectly) of a computing device, for example, PALM, INC. (Sunnyvale, Calif.), IBM CORPORATION (Armonk, N.Y.), DELL INC. (Austin, Tex.), and RESEARCH IN MOTION LIMITED (Waterloo, Canada). The developer 420 is an entity that manufactures (directly or indirectly) an accessory (or peripheral). Examples of developers 420 include PLANTRONICS, INC. (Santa Cruz, Calif.), ALIPH (San Francisco, Calif.) and SANDISK CORPORATION (Milpitas, Calif.). The escrow 415 is an entity that may be a third-party entity or controlled entity of the manufacturer 410 or developer 420 that stores software code and/or contractual agreements and performs tasks as identified within a contract between parties to that contract. Examples of escrow agents include NCC GROUP, INC. (San Jose, Calif.) and IRON MOUNTAIN INC. (Boston, Mass.). Within the ecosystem, in one embodiment there are three phases: phase one (I) is a sign up (or legal setup) phase; phase two (II) is a development phase; and phase three (III) is a runtime. Each phase is further described herein.

In the first phase, sign up, the manufacturer and the developer agree to the terms of a developer agreement such as software development kit (SDK) or a hardware development kit (HDK). The developer agreement may be a conventional developer agreement with respect to most terms and may be provided by the manufacturer. Within the terms of the developer agreement, the developer receives in the development toolset from the manufacturer the legal agreement text (LAT) and the legal response text (LRT), which are then stored by the developer.

In one embodiment the LAT and the LRT are clear text and each is approximately a few tens of bytes in size. It is noted that the clear text may be an unencrypted clear text string. The string also can be encoded in Unicode (..), UTF-8, UCS-2, SJIS, ASCII, or ISCI. It also is noted that the LAT and LRT may include hash and checksum values for subsequent check and exchange as further described herein. The use of checksum (and hash) minimizes storage requirements at both mobile computing device 110 and accessory ends and makes for simple compare to see if the text matches. Applicable checksums are generally cryptographic hashes such as the MD5 family, SHA-1, SHA-256 family and other message authentication hashes. Lower level checksums such as CRC-16 and CRC-32 can be used but do not have the same level of fidelity and make it possible to have a 'garbage' LAT/LRT masquerade as a genuine LAT/LRT due to the lower modulus of these types of checksums.

Next is the development phase. In this phase the developer 420 optionally may create a checksum for a LAT and/or LRT or may use the LAT and/or LRT character for character. For example, a developer may decide to create a checksum for the LAT only. In one embodiment, a conventional hash is used to create the checksum. This reduces the size of the LAT. The checksum resulting from the hash of the LAT is stored within a memory or other storage area of the accessory 430. It is noted that the reduced size of the LAT from this checksum process allows it to fit within even the smallest memory or other storage area of processors (or microcontrollers) within the accessory. Moreover, the smaller size also allows for faster network transmissions, e.g., communications between the device 110 and the accessory 430.

The final phase is the runtime phase. In one embodiment, a user couples (1) the accessory 430 with the mobile computing device 110. For example, the accessory 430 may be a headset device or a smart card coupled with the device 110. Once initially coupled, the mobile computing device 110 transmits (2) the LAT to the accessory 430. This LAT transmitted may be in clear text format. The accessory 430 compares the received legal agreement text with the checksum version or the clear text version of the legal agreement text stored in its memory or storage area. If no match is determined, the accessory 430 communicatively decouples the device 110 and no further communications occur between them. If a match is confirmed, the accessory 430 transmits (3) the LRT to the device 110. The mobile computing device 110 receives the LRT and compares (4) it with a stored version of the LRT. It is noted that the stored version of the LRT may be a checksum version. If there is no match, the device communicatively decouples the accessory to prevent further communications with the device. If there is a match of the LRT, the device 110 allows enumeration of the accessory 430 with the device 110, including, for example, optional transmission (5) of digital certificates.

The runtime version described above can also apply to connection of software. For example, consider a configuration in which the device 110 is a client device that is configured to communicatively couple with web services or client side programming. In this embodiment, the device 110 communicatively couples with a host system, e.g., a web server providing web services. The host system transmits LAT to the device 110. The device 110, computes a checksum on the LAT (i.e., the "contract") to see if it matches a stored version in its memory 214 (or other storage area) of a checksum of the LAT.

If there is no match, the device 110 and the host system can communicatively decouple. If there is a match, the device 110 transmits a LRT to the host system. The host system receives the LRT and computes a checksum of the legal response text. If there is no match the device 110 and the host system communicatively decouple. If there is a match, the computed checksum of the LRT and a stored version of the checksum of the LRT, then the device 110 and the host system continue with additional communications for permission negotiation, e.g., password and user identification information from the device 110 to the host system. Further, it is noted that the principles described herein is function in other similar configurations such as when the device is a host and an application (or software program) is a client with which the application is attempting communications.

It is noted that in addition to storing a checksum, each side (accessory 430 and device 110) can store a plain text copy of the LAT/LRT so as to perform a character by character comparison match to ensure that what was received matches what it is supposed. Further, it also is noted that authorization need not be submitted; rather it can be noted that authorization occurred and/or its result (either pass or fail. Moreover, the system can be configured to permit continued work even in if authorization fails. For example, a configuration in which authorization fails, but continues to work may include initiation of a trial period for new software that permits access (or functionality) for a pre-determined time period, e.g., x days, weeks, or months (x=numerical value).

It is noted that a hardware bus monitor or logic analyzer can be inserted between the mobile computing device 110 and the accessory in order to analyze communications between them. By using clear text type LAT and LRT the byte sequences of the data transmitted between the two devices can be quickly reviewed and analyzed to determine if there are adherence to contractual obligations is lacking.

Figure 5A:
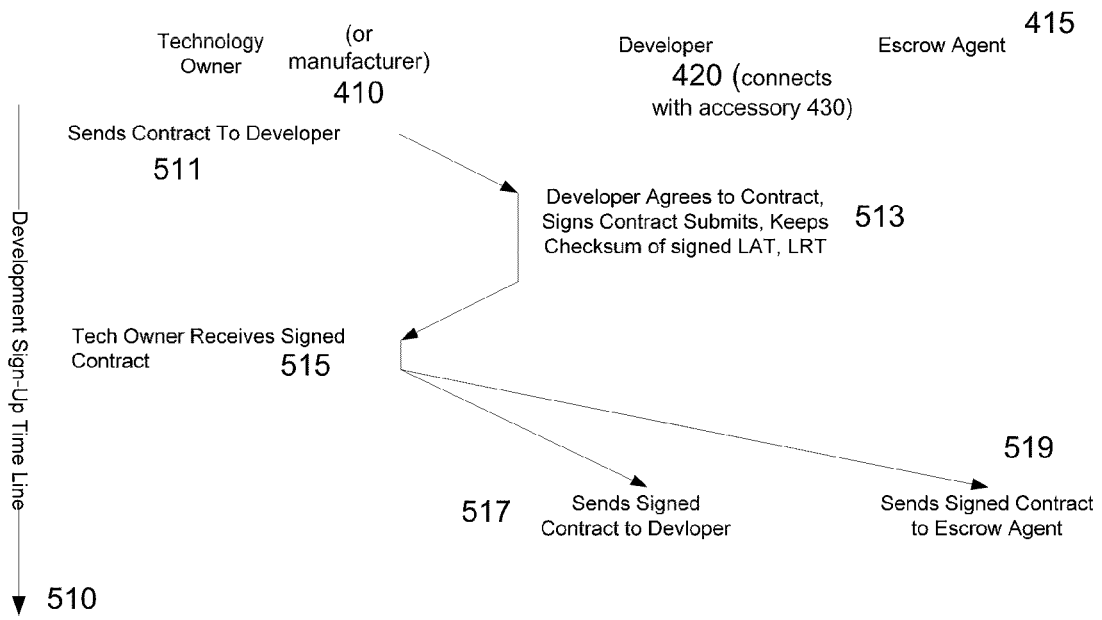
FIGS. 5a and 5b illustrates one embodiment for structuring a configuration for a startup sequence for a software program.
Figure 5B:
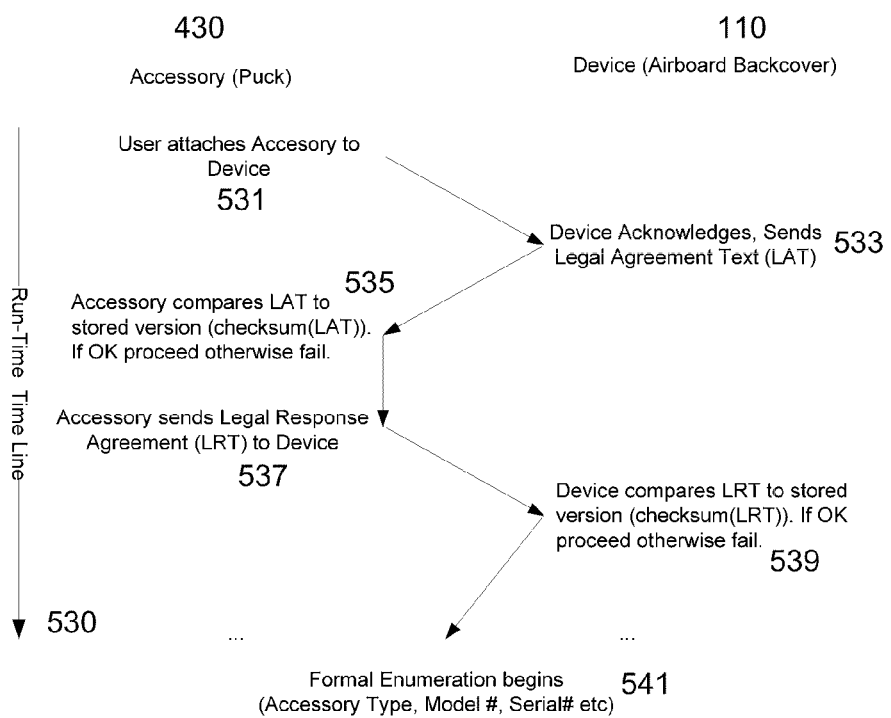

FIGS. 5a and 5b illustrates another embodiment for structuring a configuration for a startup sequence for a software program. This example embodiment includes a development side process 510 and a run-time process 530. The development side process includes the technology owner (or manufacturer) 410, the developer 420, and the escrow agent 415. It is noted that each 410, 420, 415 can be represented by a user or a machine such as a computing platform, for example, a personal computer or a mobile computing device.

The technology owner 410 transmits (or sends) 511 a contract to the developer 420. The developer 420 agrees (or confirms) 513 to the contract, e.g., signs the contract. The developer 420 also keeps, e.g., saves, a checksum of the LAT and LRT. The developer 420 transmits (or sends) 515 the accepted contract, e.g., "signed contract", back to the technology owner 410. The technology owner 410 also accepts the contract, e.g., signs the contract, and transmits (or sends) 517, 519 the completed contract to the developer 420 and the escrow agent 415. The technology owner 410, the developer 420, and the escrow agent 415 each save the contract and the saved contract can be subsequently referenced by their respective computing systems. The developer 420 also saves the appropriate files corresponding to the LAT, LRT, and/or checksum in a storage medium, e.g., memory, of the accessory (or peripheral) 430. The LAT may be stored as a checksum(LAT) and/or plain text. Likewise the technology owner 410 saves the LAT, LRT, and/or the checksum in a storage medium of a device to which an accessory will couple at some point in time. The LRT may be saved as a checksum(LRT) and/or plain text.

It is noted that the references to "sign", "signs", "signed" and "signing" in FIG. 5a includes electronic functionality corresponding to these actions. For example, each of these include acceptance of terms and such acceptance can be automated via a computing system programmed to receive a contract and trigger and acceptance response based upon the content of that contract.

Turning next to FIG. 5b, illustrated is a run-time time line leading to enumeration in accordance with the configuration structured through, for example, FIG. 5a. In this example, the process includes the accessory (or peripheral) 430 and the mobile computing device (or device) 110. When a user attaches (or wired or wireless coupling) 531 the accessory 430 to the device 110, the device acknowledges the coupling and sends (or transmits) 533 the LAT to the accessory 430. The accessory 430 compares 535 the received LAT with the stored version of the LAT. The comparison may be to a checksum of the LAT, which may be stored as a checksum (LAT), and/or with the plain text of the LAT (e.g., a character by character comparison). If the comparison determines and appropriate acceptance, e.g., a match, the process continues with the accessory 430 transmitting (or sending) 537 the LRT to the device 110.

If the comparison is not accepted, e.g., no match, then a failure is determined. The flagged failure can stop the process at this point or it can continue under alternate circumstances that allow for continued processing (with transmission of the LRT). An example of an alternate circumstance allowing for continued processing can be a limited time continuation with the process, for example, a one-time continuation or a trial for a predetermined time period such as 60-days. Another example of an alternate circumstance allowing for continued processing is a key entry (e.g., supplying a keyword or other character string) that allows for processing to continue.

Continuing with the process, once the device 110 receives the LRT, the LRT compares 539 the LRT with the stored version of the LRT. The comparison may be to a checksum of the LRT, which may be stored as a checksum(LRT), and/or with the plain text of the LRT (e.g., a character by character comparison). If the comparison determines and appropriate acceptance, e.g., a match, the process continues with processing. If no acceptance if found, e.g., no match, a failure is determined. As noted above, a failure may shut down the process from continuing or may allow for proceeding with further processing. Here, further processing would be continuing with enumeration under predefined circumstances similar to those noted above based on time periods or additional data such as key entries. Once the device is found to be accepted or otherwise allowed to proceed the process begins formal enumeration 541 (e.g., identification of accessory type, model number, serial number, etc.).

In general, with the protocol in place, the protocol confirms that the devices (and/or services) are bound by particular terms and conditions and continue with communications, e.g., enumeration. It should be noted, however, that the configuration disclosed may still permit a connection in instances where the protocol fails, e.g., no authorization for the devices (and/or services) to connect. In such instances the failure can be logged by either the host device or the peripheral. The logged information can be ignored and/or recorded and stored. A benefit of such a configuration is that users are provided some basis to assure devices (and/or services) are structured to properly communicate with each, and when they are not, be able to quickly identify where there may be an issue. In term, this provides for a better overall user experience and provides device manufactures a framework to ensure delivery of a positive user experience.

Unlike conventional ecosystems the disclosed configuration alleviates the user from having to be concerned about whether or not an accessory (or client) is authorized to connect with a device (or host). In the configurations as disclosed enumeration bytes are not transmitted between the entities until a secured channel is first established and confirmed. Thus, the disclosed embodiments beneficially provide a simple lightweight start up protocol that can be used with, even the lowest end 8-bit microcontrollers. Moreover, the protocol provides for ease of confirmation without having to use complicated and intrusive mechanisms requiring user intervention.

Further, the startup sequence, for example, can be any fixed string with the contract acknowledgement statement. Such string is sent openly open and is published for developers to use. The device, e.g., mobile computing device 110, only responds (or "wakes up" or enumerates) after receiving the contract, thereby creating a strong contractual control point. In addition, the sequence allows for ease of monitoring enforcement of contractual obligations between two entities, for example, an accessory developer and a computing device manufacturer, without requiring a user intervene or necessarily partake in the enforcement process.

Some portions of above description describe the embodiments in terms of algorithms and symbolic representations of operations on information, for example, with respect to FIGS. 2, 3, 4, 5a and 5b. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. The software and/or firmware can be executed by processor (or controller), for example, the processor 220 described with respect to FIG. 2.

Another benefit of the disclosed configurations is having accessory makers agree to the terms of using a device's accessory bus/connection, e.g., the expansion slot (not shown) described with FIG. 2, rather than having the end user agree to such terms.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives, e.g., in FIGS. 2, 4, 5a and 5b. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for a protocol for a software program (or application) to confirm a license at start up of a device or program through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer-implemented method for permitting authorization of a client device with a host device, the method comprising:
   receiving an indication of communicatively coupling with the host device;
   transmitting an agreement file to the client device, the agreement file corresponding to a pre-negotiated agreement;
   receiving from the client device a response file in response to the transmitted agreement file;
   comparing the response file with a pre-stored version of the response file;
   authorizing, in response to a match between the response file and the pre-stored version of the response file, access for the client device; and
   receiving, from the client device, enumeration data.

2. The method of claim 1, wherein comparing further comprises computing a checksum of the response file and comparing it with a pre-stored version of a checksum of the response file to determine a match.

3. The method of claim 1, wherein comparing further comprises comparing characters of the agreement file with characters in the response file to determine a match.

4. The method of claim 1, further comprising at least one of:
   communicatively decoupling from the host device in response to the determination being a no match, and
   granting access to the host device for a predetermined period of time in response to the determination being a no match.

5. The method of claim 1, wherein the agreement file comprises a legal agreement text.

6. The method of claim 5, wherein the response file comprises a legal response text.

7. The method of claim 1, wherein the client device comprises an accessory and the host device comprises a computing device.

8. The method of claim 4, wherein the accessory comprises one of a physical accessory or a logical accessory.

* * * * *